United States Patent [19]

Kroetsch et al.

[11] Patent Number: 4,700,469
[45] Date of Patent: Oct. 20, 1987

[54] DETACHABLE CLAMP FOR FIXTURING HEAT EXCHANGER CORE ASSEMBLIES FOR BRAZING IN COMBINATION WITH THE HEAT EXCHANGER CORE

[75] Inventors: Karl P. Kroetsch, Williamsville; Peter G. Wolf, Tonawanda, both of N.Y.

[73] Assignee: General Motors Corporation, Detroit, Mich.

[21] Appl. No.: 843,040

[22] Filed: Mar. 24, 1986

[51] Int. Cl.$^4$ .............................................. B23P 15/26
[52] U.S. Cl. ...................................... 29/726; 29/453; 29/526 R
[58] Field of Search ...................... 29/726, 526 R, 453; 403/351, 408, 405; 238/378, 351, , 352, 353, 354; 24/455

[56] References Cited

U.S. PATENT DOCUMENTS

| | | | |
|---|---|---|---|
| 1,615,338 | 1/1927 | Moser | 403/405.1 |
| 3,350,123 | 10/1967 | Loving et al. | 403/405.1 |
| 4,316,676 | 2/1982 | Turner | 403/405.1 |
| 4,485,597 | 12/1984 | Worrallo | 403/405.1 |

Primary Examiner—Mark Rosenbaum
Assistant Examiner—Irene Graves Golabi
Attorney, Agent, or Firm—R. L. Phillips

[57] ABSTRACT

A detachable clip is disclosed separately fixturing each of two reinforcements extending along opposite sides of a heat exchanger core to one of two headers at opposite ends of the core during brazing of the core and the reinforcements to the headers at junctures thereof and wherein the reinforcements may be assembled prior to brazing with substantial air space at their junctures with the headers but not exceeding a prescribed limit. The clip is made of a material having a coefficient of thermal expansion substantially less than the reinforcements so as to draw the reinforcements and headers together during brazing through a distance at least equal to the prescribed air space limit to thereby assure contact at all the junctures between the reinforcements and headers during the brazing thereof.

3 Claims, 3 Drawing Figures

U.S. Patent   Oct. 20, 1987   4,700,469
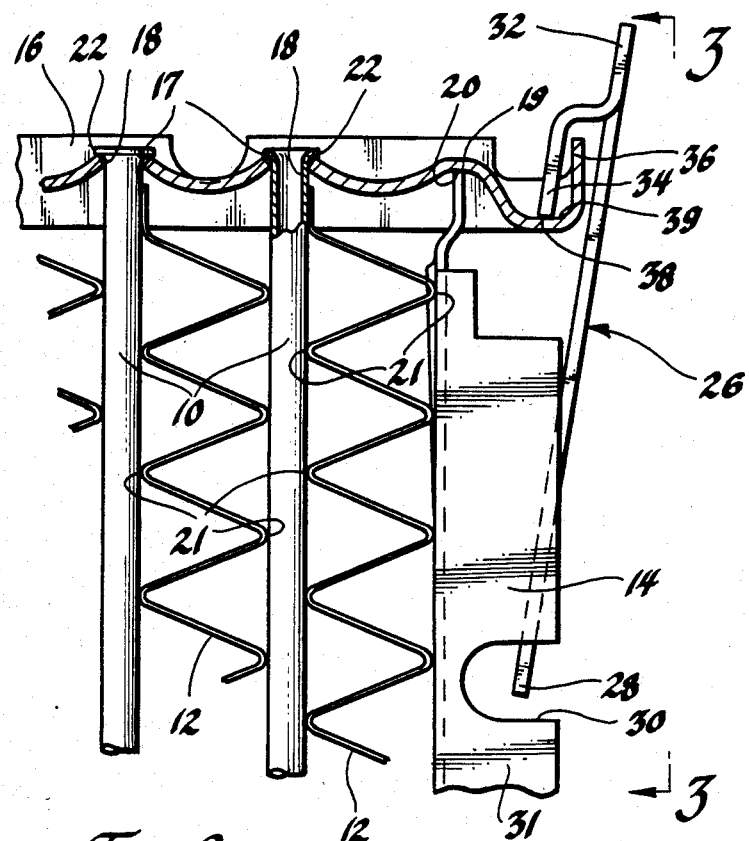
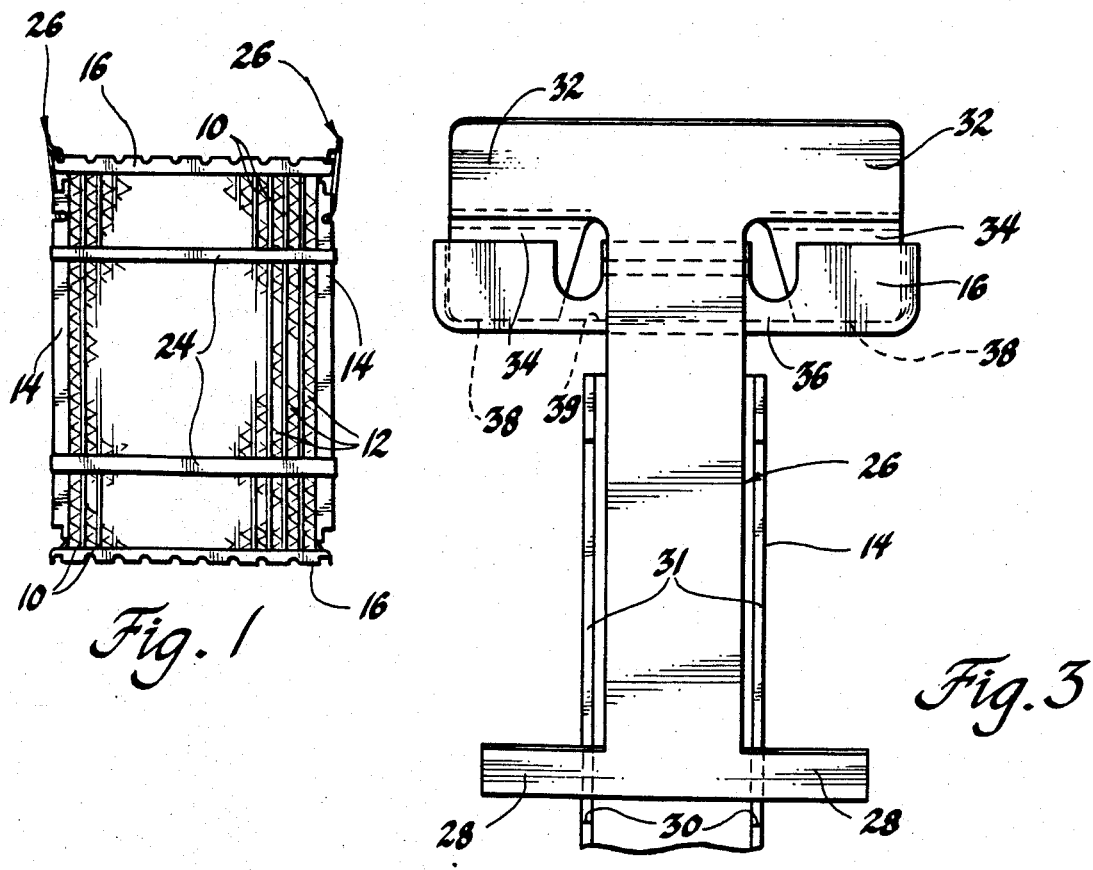

DETACHABLE CLAMP FOR FIXTURING HEAT EXCHANGER CORE ASSEMBLIES FOR BRAZING IN COMBINATION WITH THE HEAT EXCHANGER CORE

TECHNICAL FIELD

This invention relates to the fixturing of heat exchanger core assemblies for brazing and more particularly to a detachable clip for assuring proper brazing of the certain parts of the core assembly.

BACKGROUND OF THE INVENTION

In the manufacture of tube and fin heat exchanger cores having elongated reinforcements that extend along opposite sides of the core and are brazed together with the tubes to headers at opposite ends of the core, it has been the practice to flare the tube ends where they extend past the headers to ensure that the tube to header joints are subsequently brazed. In addition, one or more detachable metal bands are wrapped around the core assembly to hold the reinforcements in place for the brazing. With the core assembly thus held together by the flared tube ends and band, it is then normally brazed with the tubes in the vertical position by being supported at the upper header thereof. As a result, the core weight is supported only by the flared tube ends and it has been found that increases in core assembly size can create problems of tube slip where the tubes actually drop from the upper header during the braze cycle because of softening of the weight supporting flared tube ends and in addition, unbonded reinforcement to header joints because of the separation that then occurs between the reinforcements and the header plates.

SUMMARY OF THE INVENTION

The present invention solves both the tube slippage and reinforcement to header joint brazing problems with a simple detachable clip that separately fixtures each of the two reinforcements to the one of the two headers by which the core assembly is supported for brazing. The clips are made of a material having a thermal expansion substantially less than the reinforcements so as to draw the reinforcements and headers together during the brazing. The manufacturing tolerances are such that the reinforcements may be assembled prior to brazing with substantial air space at their junctions with the headers and the effective length and coefficient of thermal expansion of the clips is selected so that the reinforcements and headers are drawn together by the clips during brazing through a distance at least equal to the prescribed air space limit to thereby assure contact at all the junctures between the reinforcements and headers for good brazing thereof. Moreover, the detachable clips rather than the upper flared ends of the tubes support the weight of the core assembly thereby assuring proper tube support and thus good brazing of the tubes to the headers as well as insuring good reinforcement to header brazing.

DESCRIPTION OF THE PREFERRED EMBODIMENT

These and other objects, advantages and features of the present invention will become more apparent from the following description and drawing in which:

FIG. 1 is a frontal view of a motor vehicle radiator core assembly fixtured for brazing in accordance with the present invention.

FIG. 2 is an enlarged view of the right-hand upper corner of the core assembly in FIG. 1 showing the preferred embodiment of the detachable clip arrangement according to the present invention.

FIG. 3 is a view taken along the line 3—3 in FIG. 2.

Referring to the drawing wherein the same numbers are used to designate the same parts throughout the several views, there is shown in FIG. 1 a motor vehicle radiator core assembly comprising a plurality of tubes 10 of oval cross section, air centers or fins 12 each extending between adjacent tubes, a pair of reinforcements 14 of U-channel cross section sandwiching the tubes and air centers, and a pair of headers 16 located at opposite ends of the aforementioned parts. As seen in FIG. 2, the tubes prior to flaring are inserted to extend at their opposite ends 17 (only one end shown in this view) through apertures 18 formed in the header plates but the reinforcements abut at their opposite ends 19 with what is the external side 20 of the respective header plates. The air centers, on the other hand, are accordion shaped and engage at their peaks 21 with opposing sides of the tubes where they are located therebetween or with a tube and one of the reinforcements at either side of the core assembly. After the tubes are inserted in the header plates, their ends are flared over to form an annular collar 22 as shown to ensure that these tube to header joints are subsequently brazed. In addition, a pair of metal bands 24 are wrapped around the waist of the core assembly as shown in FIG. 1 to help to hold the core assembly together for brazing and in particular contact between the tubes, air centers and reinforcements. In the brazing process the core assemblies are brazed with the tubes in the vertical position as shown and are supported by the upper header and thus without further fixturing the core weight is supported only by the upper flared tube ends or collars. As a result and upon the heat of brazing, the weight of the core may cause these flared tube ends to soften to the point where they are no longer adequate to support the core weight and the tubes slip down from the upper header such that proper brazing of the joints cannot be accomplished.

According to the present invention, there is provided a detachable fixturing clip 26 that is designed so as to separately fixture each of the two elongated reinforcements to the upper header at the opposite ends of the core during the brazing and draw the reinforcements and headers tightly together for brazing as well as support the core for brazing independent of the tubes. As shown in FIGS. 2 and 3, the clips are provided at their lower end with laterally extending ears 28 that are received in aligned notches 30 formed in the outer channel sides 31 of the respective reinforcement. On the other hand, the upper end of each of the detachable clips is formed not only with laterally extending ears 32 but with lobes 34 that extend downward therefrom and together with their ears are hook-shaped in cross section so as to extend over the upwardly extending side 36 of the upper header and engage at their lower end 38 with what is the interior side 39 of the header. The two clips 26 thus overhang the two upper corners of the core assembly and are assembled prior to loading of the core assembly onto an overhead carrier (not shown) that operates to support the core assembly from the upper header thereof and convey it through the brazing operation. For example, the tubes, of course, will be received through the headers but may slip with respect thereto while on the other hand, because of manufacturing tolerances may not actually have contact at their ends with the one or both of the headers.

The action of drawing the parts together with the clips is the result of forming them from a material with a considerably lower coefficient of thermal expansion than the heat exchanger core. And thus as the temperature of the core assembly increases during the braze process, the thermal growth of the clips lags behind that of the core assembly. For example, when the core assembly comprising the tubes, air centers, headers and reinforcements are made of aluminum 3003 which has an expansion coefficient of $12.9 \times 10^{-6}$ in/in/°F. and the clip material is then selected to be AISI 1020 steel which has a substantially lower expansion coefficient of $6.7 \times 10^{-6}$ in/in/°F., there may then be provided assured contact for brazing between the headers and the reinforcements though they may be initially assembled with a substantial air space but not exceeding a prescribed limit. For example, assuming a 2.15 inch effective clip length and a 1100° F. braze temperature, use of the above materials results in a 0.0147 inch possible interference. And thus the total joint gap between the headers and the ends of the reinforcements can be as much as 0.0147" and such joints are still able to bond by operation of the clips drawing the parts together as the braze temperature is reached. Thus, the thermal expansion differential provided with the clips enables the core reinforcements to be correctly bonded even if initial fit-up is not perfect but within a prescribed limit. Furthermore, the clips maintain core-header perpendicularity while the core weight is effectively supported during the braze thus reducing tube slip. Moreover, the degree of tube flare may then be reduced thus producing a potential for relieving kinking problems associated therewith. And it will also be appreciated by those skilled in the art that while the clips have been shown to be formed of stamped sheet metal, they may also be formed of wire or even cast so long as the required thermal expansion coefficient differential results to perform the indicated task.

The above described preferred embodiment is thus illustrative of the invention which may be modified within the scope of the appended claims.

The embodiments of the invention in which an exclusive property or privilege is claimed are defined as follows:

1. In combination, a heat exchanger core having reinforcements extending along opposite sides thereof and headers at opposite ends thereof, a detachable clip for separately fixturing each of the reinforcements to one of the headers during brazing of the core and the reinforcements to the headers at junctures thereof and wherein the reinforcements may be assembled prior to brazing with substantial air space at their junctures with the headers but not exceeding a prescribed limit, characterized by the clip being made of a material having a coefficient of thermal expansion substantially less than the reinforcements so as to draw the reinforcements and headers together during brazing through a distance at least equal to the prescribed air space limit to thereby assure contact at all the junctures between the reinforcements and headers during the brazing thereof.

2. In combination, a heat exchanger core having reinforcements extending along opposite sides thereof and headers at opposite ends thereof, a detachable clip for separately fixturing each of the reinforcements to one of the headers during brazing of the core and the reinforcements to the headers at junctures thereof and wherein the reinforcements may be assembled prior to brazing with substantial air space at their junctures with the headers but not exceeding a prescribed limit, characterized by the clip engaging at one end in a notch in the respective reinforcement and engaging at another end against one side of the one header and being made of a material having a coefficient of thermal expansion substantially less than the reinforcements so as to draw the reinforcements and headers together during brazing through a distance at least equal to the prescribed air space limit to thereby assure contact at all the junctures between the reinforcements and headers during the brazing thereof.

3. In combination, a heat exchanger core having reinforcements extending along opposite sides thereof and headers at opposite ends thereof, a detachable clip for separately fixturing each of the reinforcements to one of the headers at opposite ends of the core during brazing of the core and the reinforcements to the headers at junctures thereof and wherein the reinforcements have a U-shaped cross section with parallel sides extending along the opposite sides of the core and wherein the reinforcements may be assembled prior to brazing with substantial air space at their junctures with the headers but not exceeding a prescribed limit, characterized by the clip having laterally extending ears at one end engaging in aligned notches in the sides of the respective reinforcement and having laterally extending ears with downwardly extending lobes at another end engaging against an upper side of the one header and being made of a material having a coefficient of thermal expansion substantially less than the reinforcements so as to draw the reinforcements and headers together during brazing through a distance at least equal to the prescribed air space limit to thereby assure contact at all the junctures between the reinforcements and headers during the brazing thereof.

* * * * *